(12) United States Patent
Asakura et al.

(10) Patent No.: US 9,083,197 B2
(45) Date of Patent: Jul. 14, 2015

(54) DC POWER SUPPLY APPARATUS

(75) Inventors: Fumio Asakura, Okazaki (JP); Kenji Ochi, Nishio (JP); Hiroshi Yoshida, Chiryu (JP)

(73) Assignees: NIPPON SOKEN, INC., Nishio (JP); DENSO CORPORATION, Kariya (JP)

( * ) Notice: Subject to any disclaimer, the term of this patent is extended or adjusted under 35 U.S.C. 154(b) by 855 days.

(21) Appl. No.: 13/349,292

(22) Filed: Jan. 12, 2012

(65) Prior Publication Data
US 2012/0181990 A1   Jul. 19, 2012

(30) Foreign Application Priority Data

Jan. 19, 2011   (JP) .................................. 2011-9082

(51) Int. Cl.
| | |
|---|---|
| *H02J 7/00* | (2006.01) |
| *H02J 7/02* | (2006.01) |
| *B60L 11/18* | (2006.01) |
| *H02J 1/10* | (2006.01) |
| *H02M 3/28* | (2006.01) |

(52) U.S. Cl.
CPC .............. *H02J 7/02* (2013.01); *B60L 11/1811* (2013.01); *H02J 1/102* (2013.01); *H02M 3/28* (2013.01); *Y02T 10/7005* (2013.01); *Y02T 10/92* (2013.01); *Y02T 90/127* (2013.01); *Y02T 90/14* (2013.01)

(58) Field of Classification Search
CPC ......... H02M 3/335; B60L 11/18; H02J 7/022; H02J 7/0068; Y02T 10/92
See application file for complete search history.

(56) References Cited

U.S. PATENT DOCUMENTS

2009/0034300 A1   2/2009   Ito et al.

FOREIGN PATENT DOCUMENTS

| | | |
|---|---|---|
| JP | A-5-276674 | 10/1993 |
| JP | A-7-115732 | 5/1995 |
| JP | A-07-298513 | 11/1995 |
| JP | A-2008-312382 | 12/2008 |
| JP | A-2009-033800 | 2/2009 |
| JP | A-2010-041819 | 2/2010 |
| JP | A-2010-178544 | 8/2010 |
| JP | B2-4527616 | 8/2010 |

OTHER PUBLICATIONS

Nov. 27, 2012 Office Action issued in Japanese Patent Application No. 2011-009082 (with translation).

*Primary Examiner* — Drew A Dunn
*Assistant Examiner* — Steve T Chung
(74) *Attorney, Agent, or Firm* — Oliff PLC

(57) ABSTRACT

A DC power supply apparatus includes a charging circuit, which charges a secondary battery of a vehicle from an AC power source device or a DC power source device. The charging circuit includes a non-insulating converter circuit and an insulating converter circuit. A breaker relay disconnects the AC power source device and the charging circuit in an initial charging period to supply a large charging current to the secondary battery by the non-insulating converter circuit. As a result, charging can be performed with high efficiency without the insulation transformer. The breaker relay connects the AC power source device and the charging circuit after the initial charging period. Only the insulating converter circuit supplies the charging current to the secondary battery. Thus, adverse effect of stray capacitance of a circuit of the vehicle can be eliminated.

20 Claims, 10 Drawing Sheets

DC POWER SUPPLY APPARATUS

CROSS REFERENCE TO RELATED APPLICATION

This application is based on and incorporates herein by reference Japanese patent application No. 2011-9082 filed on Jan. 19, 2011.

TECHNICAL FIELD

The present invention relates to a DC power supply apparatus, which supplies DC power and may be used, for example, in a charging system for charging a secondary battery.

BACKGROUND ART

The following patent documents disclose an insulation type DC power conversion circuit (referred to as an insulation type DC/DC converter or an insulating converter), the primary side and the secondary side of which are insulated by an insulating transformer. The insulating converter is effective to suppress ground leakage of current.
Patent document 1: JP H07-298513A
Patent document 2: JP 2008-312382A
Patent document 3: JP 2009-33800A (US 2009/0034300A1)
Patent document 4: JP 4527616

In a battery charging system, in which a DC power supply apparatus may be used, a secondary battery may be charged from a power supply source such as a commercial power source. In case that the secondary battery is mounted in a mobile vehicle such as a four-wheel car, a motorcycle, a ship and an airplane, a circuit mounted in the mobile vehicle sometimes has a large stray capacitance. For example, in a case that a secondary battery is mounted in a vehicle such as a plug-in hybrid car, a capacitance between a high-voltage circuit mounted in the car and a chassis of the car is large. The capacitance includes a capacitance of a filter circuit and stray capacitances of other circuits. The power supplied from the commercial power line system may leak to the ground through the stray capacitances. If leakage of current increases, a ground-fault breaker provided between the commercial power line system and the DC power supply apparatus will operate to shut off the power supply. An insulating converter, which uses a switching circuit and an insulating transformer, is effective to prevent ground leakage of current. The switching circuit and the insulating converter however lowers efficiency of power conversion.

SUMMARY

It is therefore an object to provide a DC power supply apparatus, which has an improved high power conversion efficiency.

It is another object to provide a DC power supply apparatus, which exhibits not only an improved power conversion efficiency but also ground leakage suppression function provided by an insulating converter.

It is a further object to provide a DC power supply apparatus, which exhibits a ground leakage suppression function in case of receiving power from a commercial power line system and realizes a high efficiency in case of receiving power from a secondary battery.

A DC power supply apparatus is provided for converting power supplied from a power source device including a commercial power line system and supplying DC power to a load device. The DC power supply apparatus has a conversion circuit and a breaker device. The conversion circuit is configured to supply the DC power and includes an insulating transformer. The conversion circuit is switchable to operate as a non-insulating converter circuit, in which an input and an output is not insulated by the insulating transformer, or as an insulating converter circuit, in which the input and the output are insulated by the insulating transformer. The breaker device is configured to shut off power supply from the commercial power line system to the non-insulating converter circuit, when the conversion circuit supplies the DC power by the non-insulating converter circuit.

BRIEF DESCRIPTION OF THE DRAWINGS

The above and other objects, features and advantages of a DC power supply apparatus becomes more apparent from the following detailed description made with reference to the accompanying drawings. In the drawings.

DETAILED DESCRIPTION OF EMBODIMENT

Figure 1:
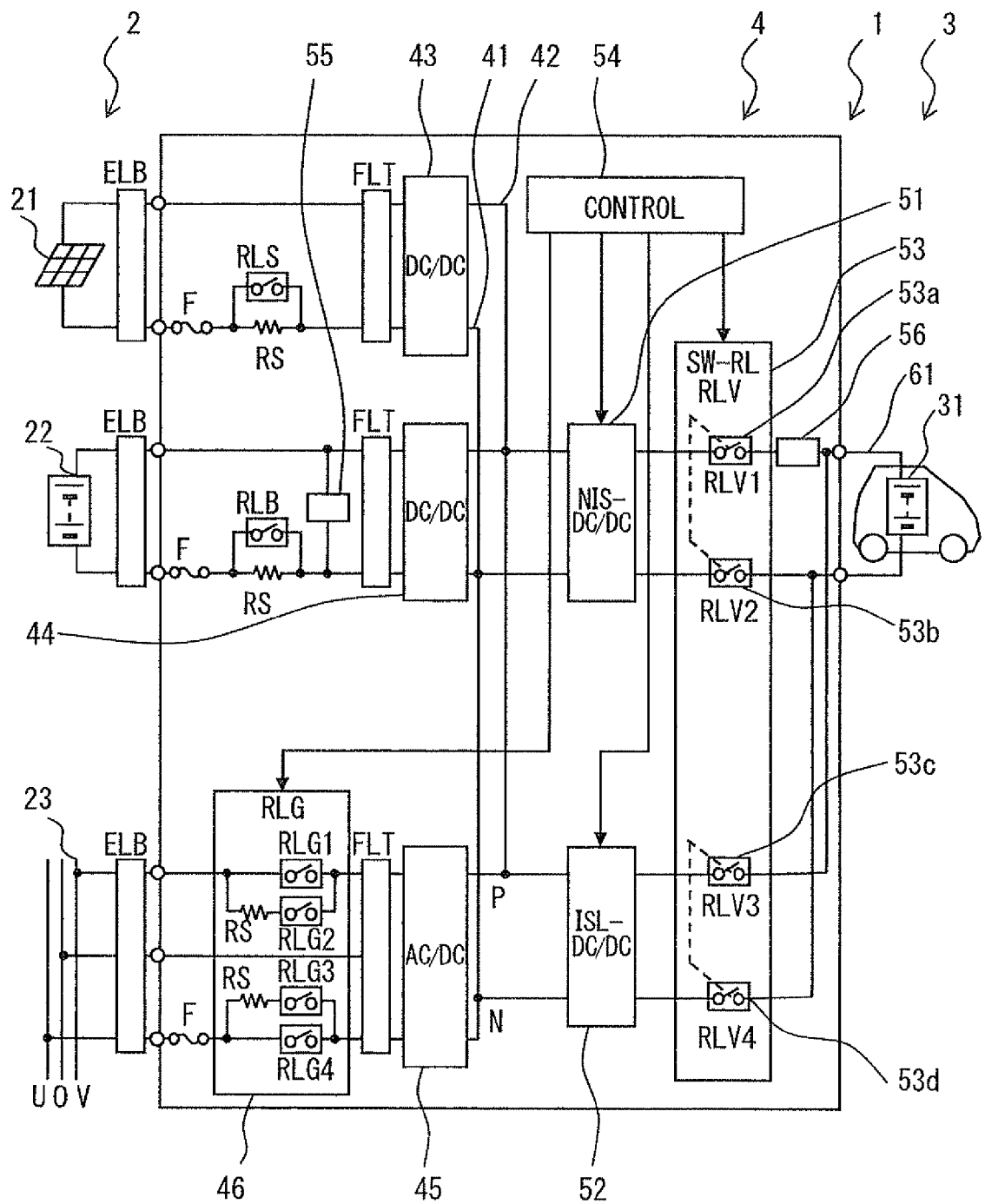
FIG. 1 is a block diagram of a charging system including a DC power supply apparatus according to a first embodiment.

A DC power supply apparatus will be described below in detail with reference to plural embodiments shown in the drawings. In each embodiment, same or similar reference numerals are used for same or similar parts among the plural embodiments thereby to omit the same description.

First Embodiment

Referring to FIG. 1, a charging system 1 includes a DC power supply apparatus according to a first embodiment. The charging system 1 includes one or plural power source devices 2, one or plural load devices 3 and a charging circuit 4, which is a conversion circuit for converting power supplied from each power source device 2. Power supplied from the power source device 2 is converted to DC power of a predetermined voltage by the charging circuit 4 and supplied to the load device 3. The charging system 1 may be formed for a house, a housing complex or a charging station, which is provided for charging an unspecified number of load devices.

Each power source device 2 supplies power of a predetermined power source voltage. The power source device 2 may be a DC power source for supplying DC power or an AC power source for supplying AC power. The DC power source includes a solar power generator 21 and a stationary type secondary battery 22. The AC power source includes a commercial power source, which is an AC commercial power line system 23. The solar power generator 21 includes a semiconductor solar battery panel mounted on a roof of a house or a building, for example. The voltage generated by the solar power generator 21 varies with the amount of solar radiation. The stationary secondary battery 22 is fixedly provided as a main secondary battery for the charging system 1. The secondary battery 22 is a battery fixedly provided in a house. The secondary battery 22 is fixedly connected to the charging circuit 4. The secondary battery 22 may be referred to a first secondary battery. The secondary battery 22 is chargeable by power supplied from other power source devices 2 or a secondary battery 31 of the load device 3. For example, the secondary battery 22 is charged by power supplied from the solar power generator 21 or power supplied from the commercial power line system 23. The secondary battery 22 may also be included in the load device 3. The commercial power line system 23 is a power transmission network provided by a power supplier such as an electric power company. The commercial power line system 23 is a single-phase three-line power source and has a neutral line (0) and voltage lines (U, V). The power source device 2 may further include small-sized power generation equipment such as a fuel cell or a wind power generator.

The load device 3 includes the secondary battery 31 of the vehicle. The secondary battery 31 is mounted on the vehicle and is a secondary battery used as a drive power source for vehicle travel or a power source for a large load such as an air-conditioner of the vehicle. The secondary battery 31 becomes a part of a power system for a house, when the vehicle parks at a predetermined position and the vehicle and the charging circuit 4 are connected by cables 61 through respective connectors. The secondary battery 31 and the charging circuit 4 are disconnected when the vehicle moves. The secondary battery 31 is connected to the charging circuit 4 to charge the secondary battery 31 from the charging circuit 4 or supply power from the secondary battery 31 to the load device 3 or the power source device 2 through the charging circuit 4. The secondary battery 31 may be referred to as a second secondary battery. The secondary battery 31 has a relatively large capacity, so that it may be used as a drive power source for vehicle travel. The capacity of the secondary battery 31 of the vehicle may have a capacity, which is larger than that of the stationary type secondary battery 22. The secondary battery 31 is connected to the charging circuit 4 only when the vehicle is parked near a house. The secondary battery 31 is connected to the charging circuit 4 for a comparatively short period of time. The secondary battery 31 therefore need be charged rapidly within a short period of time. The secondary battery 31 can be charged with a comparatively large charging current during a former period (initial stage) in its charging period. For example, the charging speed for the secondary battery 31 is set to be larger than that of the secondary battery 22. The load device 3 may further include other loads such as a lighting device or a hot-water supply device.

The charging circuit 4 is a power conversion circuit, which converts the power supplied from the power source device 2 and supplies DC power to the load device 31. The charging circuit 4 also forms the DC power supply apparatus, which supplies the power source device 2 with the power supplied from the load device 3. The charging circuit 4 thus forms a multi-input and multi-output power distribution network, which is connectable to plural power source devices 2 and plural load devices 3. The charging circuit 4 may be referred to a power distribution device. The charging circuit 4 includes, as DC power lines, a negative line (N) 41 and a positive line (P) 42, which respectively provide the negative-side potential and the positive-side potential. The charging circuit 4 and the secondary battery 31 are connected through the cables 61 provided for charging. The cables 61 are shielded wires. The cables 61 electrically connect a casing of the charging circuit 4 and a chassis of the vehicle, which accommodates the secondary battery 31 to equalize the potentials therebetween.

The charging circuit 4 includes plural converter circuits 43, 44 and 45 provided between the plural power source devices 2 and the DC power lines. The plural converter circuits 43, 44 and 45 convert the power supplied from the power source devices 2 and supply the power to the DC power lines. The converter circuits 43, 44 and 45 also supply the power supplied from the DC power lines to the power source devices 2. The charging circuit 4 includes plural converter circuits 51 and 52 provided between the DC power lines and the load device 3. The plural converter circuits 51 and 52 convert power supplied from the DC power lines and supply the converted power to the load device 3. The plural converter circuits 51 and 52 may also supply power to the DC power lines.

The converter circuit 43 is a full-bridge type step-up and step-down booster converter circuit (DC/DC). The converter circuit 43 supplies the DC power lines with a voltage, which is stepped up or down from an output voltage of the solar power generator 21. The power generation of the solar power generator 21 varies with an amount of solar radiation. The terminal voltage of the solar power generator 21 is controlled such that the solar power generator 21 can output maximum power. The converter circuit 43 maintains the DC inter-line voltage developed between the lines at a fixed level, even when the voltage of the solar power generator device 21 varies. The DC inter-line voltage is a voltage developed between the negative line 41 and the positive line 42.

The converter circuit 44 is a full-bridge type step-up and step-down converter circuit (DC/DC). The converter circuit 44 is a two-way conversion circuit. The converter circuit 44 supplies the DC power lines with a voltage, which is stepped up or down from the terminal voltage of the secondary battery 22. The converter circuit 44 supplies the secondary battery 22 with a voltage, which is stepped up or down from the voltage of the DC power lines. The converter circuit 44 is controlled to charge the secondary battery 22 with primarily the power of the commercial power line system 23. For example, the converter circuit 44 charges the secondary battery 22 with midnight power of the commercial power line system 23. The converter circuit 44 supplies the power of the secondary battery 22 to the DC power lines and to the load device 3, when no power is supplied from the commercial power line system 23.

Figure 2:
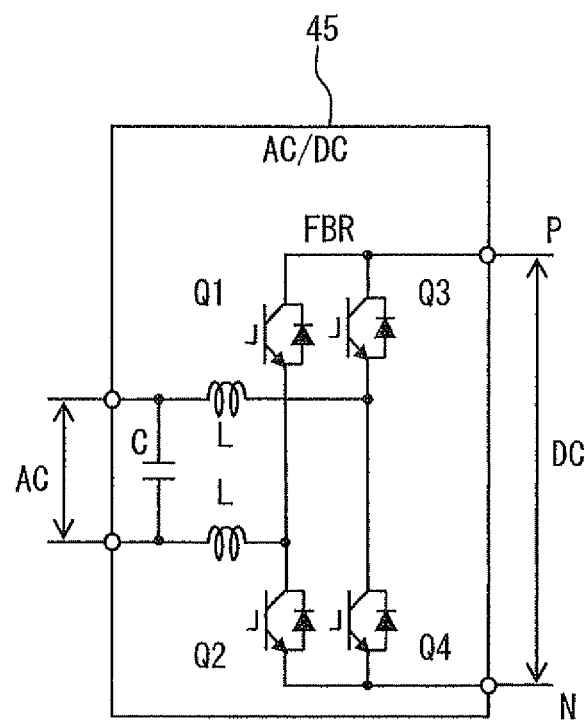
FIG. 2 is a circuit diagram of an AC/DC conversion circuit in the first embodiment.

The converter circuit 45 is configured as shown in FIG. 2. The converter circuit 45 is an AC/DC conversion circuit. The converter circuit 45 is a two-way conversion circuit. The converter circuit 45 supplies the DC power lines with a voltage, which is stepped up or down from the AC voltage of the commercial power line system 23 and rectified. The converter circuit 45 supplies the commercial power line system 23 with a voltage, which is stepped up or down from the DC power line. The converter circuit 45 includes a smoothing capacitor C, two reactors L and four switching elements Q1, Q2, Q3 and Q4 forming a full-bridge circuit FBR. The switching elements Q1, Q2, Q3 and Q4 may be IGBT elements, for example.

Figure 3:
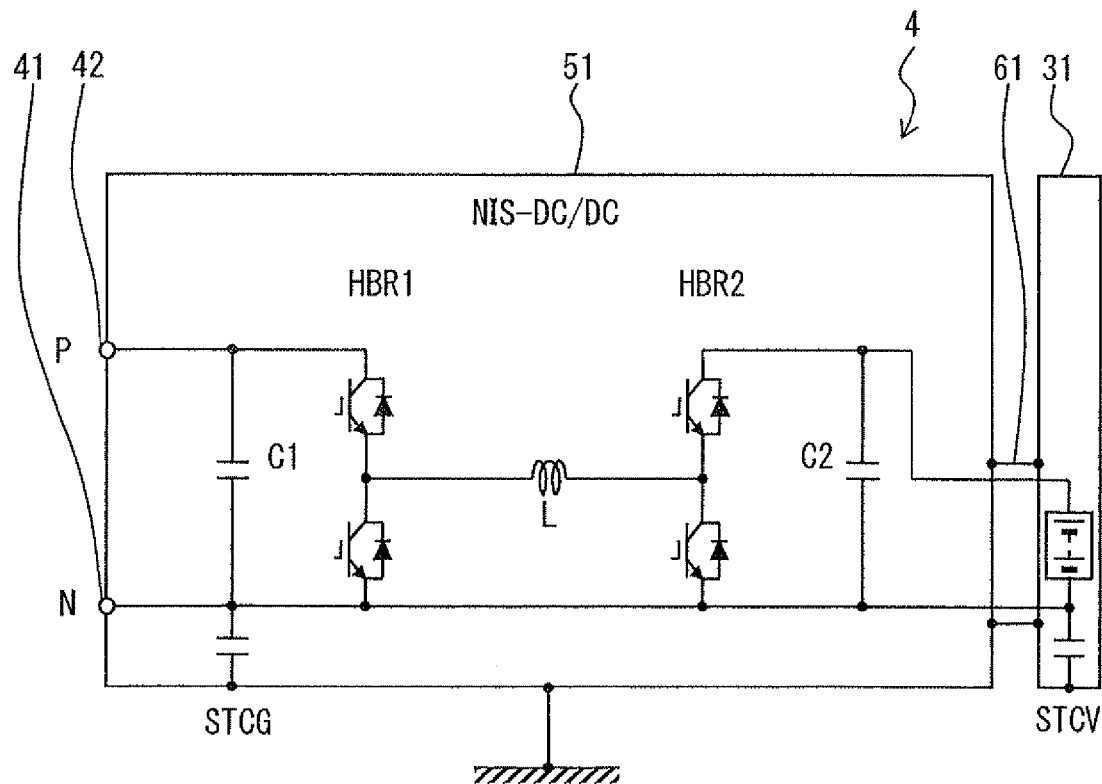
FIG. 3 is a circuit diagram of a non-insulation type DC power conversion circuit in the first embodiment.

The non-insulating converter circuit 51 is configured as shown in FIG. 3. The non-insulating converter circuit 51 is a non-insulated type DC power conversion circuit (NIS-DC/DC), which has no insulating component, which electrically insulate its input side and output side. The non-insulating converter circuit 51 has circuits, which are arranged symmetrically as a two-way step-up and step-down converter circuit. The non-insulating converter circuit 51 is a step-up/down converter circuit for supplying a voltage, which is stepped up or down from the voltage of the DC power lines to charge the secondary battery 31. The non-insulating converter circuit 51 may include a step-up converter or a step-down converter. The non-insulating converter circuit 51 includes a reactor L, half-bridge circuits HBR1 and HBR2, which are provided at both sides of the reactor L, and smoothing capacitors C1 and C2 provided at both sides. Each of the half-bridge circuits HBR1 and HBR2 is formed of series-connected two switching elements. The non-insulating converter circuit 51 supplies a voltage, which is stepped up or down when the switching elements are switching-controlled, that is, when controlled to switch over between ON-state and OFF state.

The casing of the charging circuit 4, which accommodates the non-insulating converter circuit 51 therein, is grounded. When the non-insulating converter circuit 51 is connected to the secondary battery 31 through the cables 61, a stray capacitance STCG is formed in the charging circuit 4 including the non-insulating converter circuit 51, for example, between the negative line 41 and the casing of the non-insulating converter circuit 51. Further, a stray capacitance STCV is formed in a circuit mounted in the vehicle including the secondary battery 31, for example, between the negative line 41 and the casing of the secondary battery 31. The non-insulating converter circuit 51 does not electrically insulate an inside of the charging circuit 4 into an input side and an output side. As a result, the stray capacitances STCG and STCV form large stray capacitances to the charging circuit 4. If the commercial power line system 23 and the charging circuit 4 are electrically connected, leak currents, which flow through the stray capacitances STCG and STCV, are likely to activate a ground-fault circuit breaker ELB shown in FIG. 1.

Figure 4:
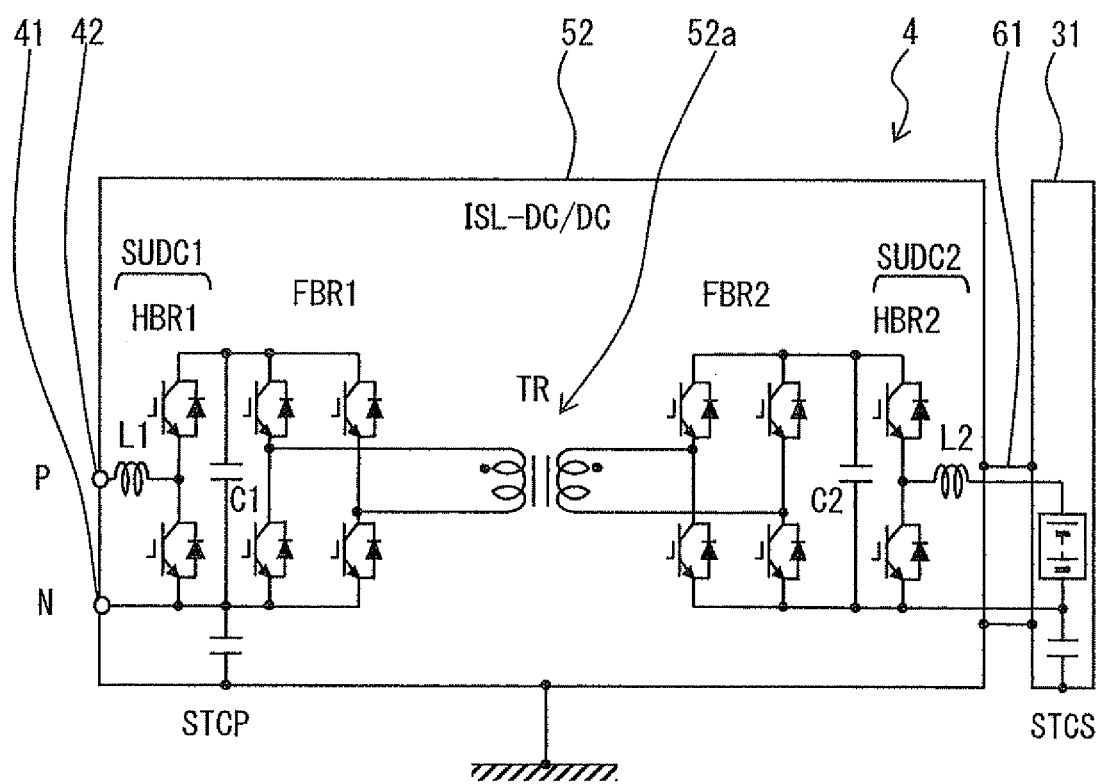
FIG. 4 is a circuit diagram of an insulation type DC power conversion circuit in the first embodiment.

The insulating converter circuit 52 is configured as shown in FIG. 4. The insulating converter circuit 52 is an insulated-type DC power conversion circuit (ISL-DC/DC). The insulating converter circuit 52 has circuits, which are arranged symmetrically as a two-way step-up and step-down converter circuit. The insulating converter circuit 52 is a step-up/down converter circuit for supplying a voltage, which is stepped up or down from the voltage of the DC power lines to charge the secondary battery 31. The insulating converter circuit 52 may include a step-up converter or a step-down converter. The insulating converter circuit 52 includes an insulating transformer (TR) 52a, a first full-bridge circuit FBR1 connected to a primary coil of the insulating transformer 52a and a second full-bridge circuit FBR2 connected to a secondary coil of the insulating transformer 52a. The full-bridge circuit FBR1 supplies an AC current to the primary coil of the insulating transformer 52a. The full-bridge circuit FBR2 supplies an AC current to the secondary coil of the insulating transformer 52a. A smoothing capacitor C1 is provided at a DC side of the full-bridge circuit FBR1. A smoothing capacitor C2 is provided at a DC side of the full-bridge circuit FBR2. Each of the full-bridge circuits FBR1 and FBR2 is formed of bridge-connected four switching elements. The insulating converter circuit 52 supplies a voltage, which is stepped up or down when the switching elements are switching-controlled.

The insulating converter circuit 52 includes at both ends thereof a step-up/down converter circuits SUDC1 and SUDC2. The step-up/down converter circuit SUDC1 is provided at the DC side of the full-bridge circuit FBR1. The step-up/down converter circuit SUDC2 is provided at the DC side of the full-bridge circuit FBR2. The step-up/down converter circuit SUDC1 includes a reactor L1 and a half-bridge circuit HBR1. The step-up/down converter circuit SUDC1 supplies a voltage, which is stepped up or down when the switching elements forming the half-bridge circuit HBR1 are switching-controlled. The step-up/down converter circuit SUDC1 may be omitted, and instead the converter circuits 43, 44 and 45 may be configured to perform the function of the step-up/down converter circuit SUDC1. The step-up/down converter circuit SUDC2 includes a reactor L2 and a half-bridge circuit HBR2. The step-up/down converter circuit SUDC2 supplies a voltage, which is stepped up or down when the switching elements forming the half-bridge circuit HBR2 are switching-controlled.

The casing of the charging circuit 4 including the insulating converter circuit 52 therein is grounded. When the insulating converter circuit 52 is connected to the secondary battery 31, a stray capacitance STCP is formed in a circuit connected to the primary side of the insulating transformer 52a. A stray capacitance STCS is formed in a circuit, which is connected to the secondary side of the insulating transformer 52a includes the secondary battery 31. The insulating transformer 52a elctrically insulates the primary side and the secondary side thereof from each other, that is, the input side and the output side of the insulating converter circuit 52. As a result, a current in the primary side is prevented from directly flowing through the stray capacitance STCS in the secondary battery 31.

The power conversion efficiency of the non-insulating converter circuit 51 in case of charging the secondary battery 31 is higher than that of the insulating converter circuit 52 in case of charging the secondary battery 31. That is, the non-insulating converter circuit 51 is configured to exhibit higher power conversion efficiency than the insulating converter circuit 52 exhibits.

Referring again to FIG. 1, the ground-fault circuit breakers ELB are provided between the power source devices 2 and the charging circuit 4.

Filters FLT are provided for the converter circuits 43, 44 and 45 to remove high frequency noises. Fuses F are provided at the low potential sides between the power source devices 2 and the converter circuits 43, 44 and 45. Resistors RS are provided for limiting over-current or conduction testing.

A system relay RLS is provided for the solar power generator 21 and closed after the solar power generator 21 is connected to the charging circuit 4. A system relay RLB is provided for the secondary battery 22 and closed after the secondary battery 22 is connected to the charging system. A system relay RLG is provided for the commercial power line system 23 and closed after the commercial power line system 23 is connected to the charging circuit 4. The system relay RLG is also a breaker device, which shuts off electric connection between the commercial power line system 23 and the charging circuit 4 to disconnect the two. The system relay RLG may be referred to as a breaker relay 46. The breaker relay 46 is opened and closed in correspondence to commands from the control circuit 54.

The breaker relay 46 includes plural relays RLG1, RLG2, RLG3 and RLG4. The commercial power line system 23 and the charging circuit 4 are connected by closing at least the relays RLG1 and RLG4. The commercial power line system 23 and the charging circuit 4 are disconnected from each other by opening all the relays RLG1, RLG2, RLG3 and RLG4. The breaker relay 46 shuts off power supply from the commercial power line system 23 to the non-insulating converter circuit 51, when the charging circuit 4 supplies DC power by the non-insulating converter circuit 51.

A system relay RLV is provided for the load device 3, that is, secondary battery 31 of the vehicle, and is closed after the secondary battery 31 is connected to the charging circuit 4. The system relay RLV is also a breaker device, which shuts off electric connection between the secondary battery 31 and the charging circuit 4 to disconnect the two from each other. The system relay RLV is also a switching device, which switches over a charging circuit for the secondary battery 31. The system relay RLV may be referred to as a switching relay (SW-RL) 53. The switching relay 53 is opened and closed in correspondence to commands from the control circuit 54. The switching relay 53 includes plural relays (RLV1, RLV2, RLV3 and RLV4) 53a, 53b, 53c and 53d. The relays 53a, 53b, 53c and 53d are single-throw type. The switching relay 53 is a switching device, which switches over the charging circuit 4 for supplying the charging current to the secondary battery 31 to either a non-insulating circuit including the non-insulating converter circuit 51 or an insulating circuit including the insulating converter circuit 52. The charging circuit 4 is capable of switching the circuit for supplying charging current to the secondary battery 31 to either the non-insulating converter circuit 51 or the insulating converter circuit 52. The charging circuit 4 is switchable to a state for supplying DC power by the non-insulating converter circuit 51, in which the input and the output are not insulated, and to a state for supplying DC power by the insulating converter circuit 52, in which the input and the output are insulated by the insulating transformer 52a.

The control circuit in the charging circuit 4 is configured to control the plural switching elements and the relays provided in the charging circuit 4 so that circuit elements provided in the charging circuit 4 perform respective functions. The control circuit 54 controls switching elements in the converter circuits 43, 44, 45, 51 and 52. The control circuit 54 further controls the system relays RLS, RLB, RLG and RLB. The charging circuit 4 includes plural sensors, which respectively detect voltages and currents of the power source devices 2 and voltages and currents of the load devices 3. Detection signals of these sensors are inputted to the control circuit 54. The control circuit 54 controls various circuits provided in the charging circuit 4 in correspondence to the detection signals of the sensors. The sensors include a voltage sensor 55 for detecting a voltage V22 of the secondary battery 22 and a current sensor 56 for detecting a charging current Ichr supplied to the secondary battery 31.

The control circuit 54 includes a microcomputer having a memory device. The memory device stores computer-readable programs. The control circuit 54 is programmed to switch over the mode of operation of the charging circuit 4 to a non-insulating circuit and an insulating circuit. The non-insulating circuit charges the secondary battery 31 from the secondary battery 22 with high power conversion efficiency under a condition that the commercial power line system 23 and the charging circuit 4 are electrically disconnected. In the non-insulating circuit, the commercial power line system 23 and the charging circuit 4 are disconnected so that only the non-insulating converter circuit 51 operates. That is, in the non-insulating circuit, power for charging is supplied from the power source device 2 other than the commercial power line system 23.

The insulating circuit charges the secondary battery 31 from the commercial power line system 23 while suppressing ground leakage. In the insulating circuit, the commercial power line system 23 and the charging circuit 4 are conductively connected so that only the insulating converter circuit 52 operates. That is, in the insulating circuit, power for charging is supplied from the power source device 2 including the commercial power line system 23. The charging circuit 4 supplies DC power by the non-insulating converter circuit 51 when a predetermined condition is satisfied. However it supplies DC power only by the insulating converter circuit 52 when the predetermined condition is not satisfied. For example, the predetermined condition may be defined by a threshold, which separates the former period (initial charging period or stage) and the latter period (latter charging period or stage) of charging of the secondary battery 31. It is thus possible in this case to supply DC power by the non-insulating converter circuit 51 in the former period and then by the insulating converter circuit 52 in the latter period.

The threshold between the former period and the latter period of charging, may be set as an index, for example, corresponding to time from the start of charging measured by a timer circuit or current supplied to charge the secondary battery 31. For example, the predetermined condition may be set to indicate that the time from the start of charging is shorter than a predetermined time or the charging current is larger than a predetermined value. The predetermined condition may be set to indicate the threshold, which corresponds to a capacity of power supply of the power source devices 21 and 22 other than the commercial power line system 23. In this instance, the DC power may be supplied by the non-insulating converter circuit 51 and the insulating converter circuit 52 when the capacity of power supply is high and low, respectively. The threshold, which indicates the capacity of power supply, may be set as an index in correspondence to the output voltage V22 of the power source device 2. For example, the predetermined condition may be set to correspond that the output voltage V22 of the power source device 2 is higher than a predetermined voltage Vth. The switching-over between the non-insulating circuit and the insulating circuit is performed based on whether a predetermined switching condition is satisfied. For example, the control circuit 54 switches the charging circuit 4 to the non-insulating circuit when efficiency is prioritized, and switches the charging circuit 4 to the insulating circuit when ground leakage prevention is prioritized. For example, it is possible to switch over by selecting either one of the non-insulating circuit and the insulating circuit based on an instruction of a user. It is further possible to switch over by selecting either one of the non-insulating circuit and the insulating circuit based on an application of the charging circuit 4.

Alternatively, the control circuit 54 may automatically switch over to the non-insulating circuit or the insulating circuit. For example, the control circuit 54 switches the charging circuit 4 to the non-insulating circuit in the former period of charging the secondary battery 31 and to the insulating circuit in the latter period of charging the secondary battery 31. In another example, the control circuit 54 switches the charging circuit 4 to the non-insulating circuit in case that the charging current to the secondary battery 31 is larger than a predetermined value and to the insulating circuit in case that the charging current to the secondary battery 31 is smaller than the predetermined value. In a further example, the control circuit 54 switches the charging circuit 4 to the non-insulating circuit in case that the power source device 2 other than the commercial power line system 23 is capable of supplying charging power to the secondary battery 31 and to the insulating circuit in case that the power source device 2 other than the commercial power line system 23 is not capable of supplying charging power to the secondary battery 31.

Figure 5:
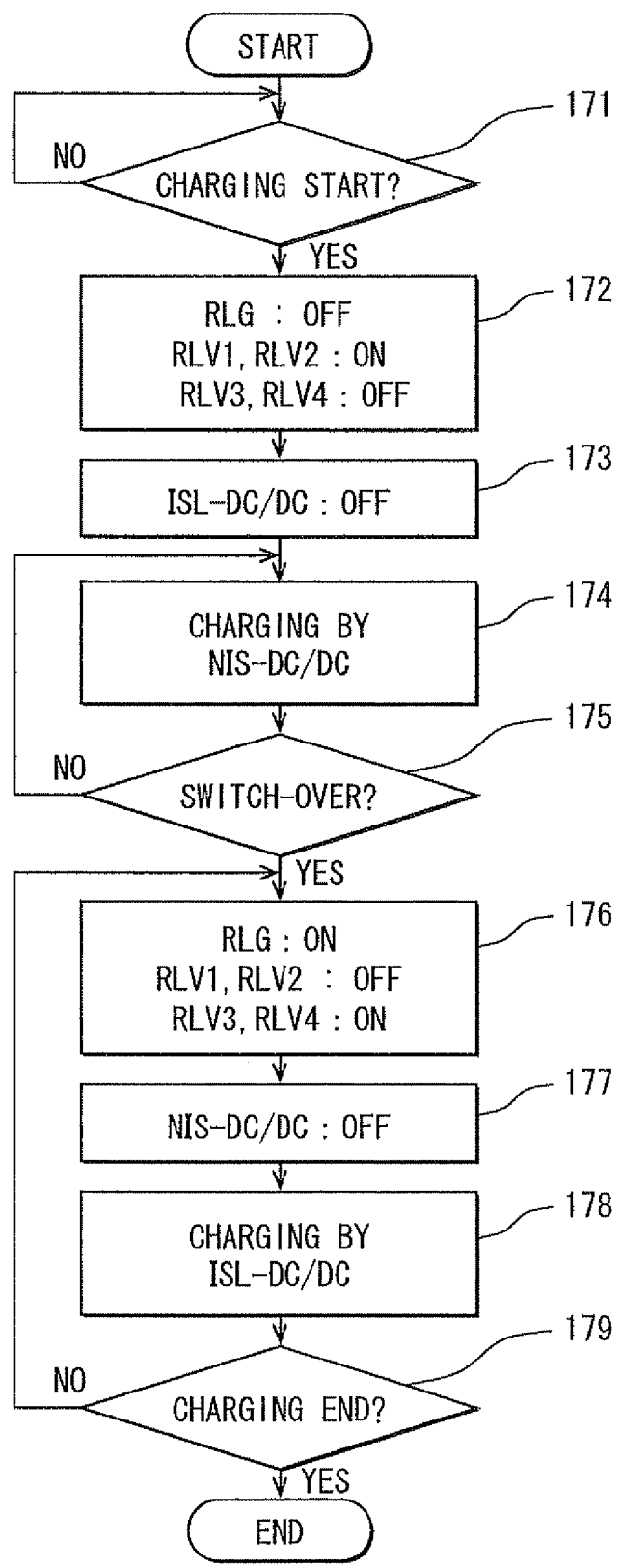
FIG. 5 is a flowchart showing an operation performed by a control circuit in the first embodiment.

For the above-described switching-over operation, the control circuit 54 is configured to perform control processing shown in FIG. 5. The control circuit 54 executes switching control processing repeatedly every predetermined cycle.

At step 171, it is checked whether charging the secondary battery 31 is to be started. This processing is performed by checking whether the charging circuit 4 and the secondary battery 31 are connected by the cables 61. At step 172, the breaker relay (RLG) 46 is driven to the OFF state. Thus, the commercial power line system 23 and the charging circuit 4 are electrically disconnected. The current supply from the commercial power line system 23 to the charging circuit 4 is shut off. Further, the switching relay (SW-RL) 53 is driven to the non-insulated (NIS) state to connect the non-insulating converter circuit 51 and the storage battery 31. That is, the relays (RLV1, RLV2) 53a, 53b in the first set are driven to the ON state, and the relays (RLV3, RLV4) 53c, 53d in the second set are driven to the OFF state. At step 173, the insulating converter circuit 52, which is disconnected from the secondary battery 31, is driven to the OFF state and disabled to operate. That is, the function of the insulating converter circuit 52 is stopped. Thus, the charging circuit 4 operates as only the non-insulating circuit. At step 174, the non-insulating circuit performs charging. That is, the non-insulating converter circuit 51 is controlled to charge the secondary battery 31.

At step 175, it is checked whether a predetermined switching condition is satisfied. The current supplied in the former period of charging the secondary battery is generally larger than that supplied in the latter period of charging the secondary battery. For example, at step 175, it is checked whether a large current for the former period of charging is being supplied. At step 175, it may be checked whether the power source device 2 other than the commercial power line system 23 is capable of supplying sufficient power to charge the secondary battery 31. Step 174 is repeated until the switching condition is satisfied at step 175. Thus, the charging circuit 4 continues to perform the charging operation by the non-insulating inverter circuit 51. Step 176 is executed when the switching condition is satisfied.

At step 176, the breaker relay (RLG) 46 is driven to the ON state. Thus, the commercial power line system 23 and the charging circuit 4 are electrically connected. The current supply from the commercial power line system 23 to the charging circuit 4 is enabled. Further, the switching relay (SW-RL) 53 is driven to the insulated (ISL) state. That is, the relays (RLV1, RLV2) 53a and 53b in the first set are driven to the OFF state, and the relays (RLV3, RLV4) 53c and 53d in the second set are driven to the ON state. At step 177, the non-insulating converter circuit 51 is driven to the OFF state and disabled to operate. That is, the function of the insulating converter circuit 52 is stopped. Thus, the charging circuit 4 operates as only the insulating circuit. At step 178, the charging circuit 4 performs charging of the secondary battery 31 by selecting the insulating converter circuit 52. The insulating converter circuit 52 is thus controlled to charge the secondary battery 31.

At step 179, it is checked whether the charging of the secondary battery 31 has been ended. Step 176 is executed again if the charging of the secondary battery 31 has not been finished yet. Thus, the insulating circuit continues to perform the charging operation. The switching control processing is finished when the charging of the secondary battery 31 is finished.

As described above, when the charging circuit 4 supplies DC power by the non-insulating converter circuit 51, the breaker relay 46 shuts off the power supply from the commercial power line system 23 to the non-insulating converter circuit 51 thereby to allow the power supply to the non-insulating converter circuit 51 from only the power source devices 21 and 22 other than the commercial power line system 23. Further, when the charging circuit 4 supplies DC power by the insulating converter circuit 52, the charging circuit 4 allows the power supply from the commercial power line system 23 to the non-insulating converter circuit 51 thereby to convert the power supplied from the commercial power line system 23 only by the converter circuit 51.

Figure 6:
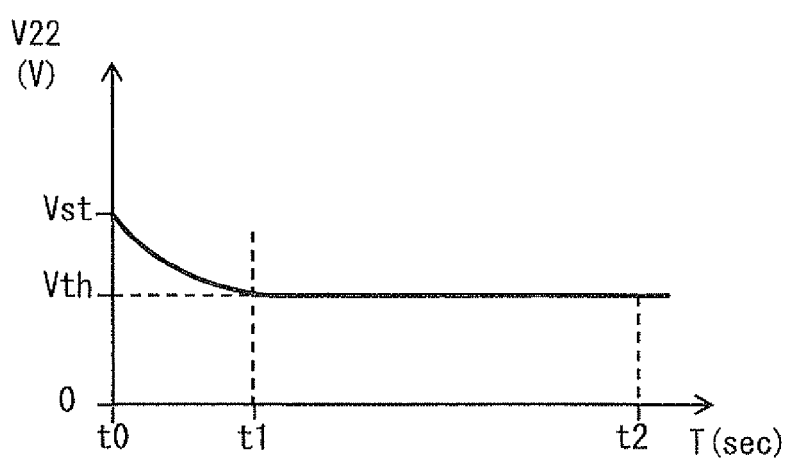
FIG. 6 is a graph showing a voltage of a stationary secondary battery in the first embodiment.

In the first embodiment, the voltage V22 of the secondary battery 22 varies as shown in FIG. 6. In the example shown in the figure, charging is started from time t0. At time t0, the voltage V22 is Vst. The non-insulating circuit performs charging from time t0 to time t1. At time t1, the insulating circuit performs charging when the voltage V22 falls below a threshold voltage Vth at time t1. The threshold voltage Vth corresponds to the switching condition. The threshold voltage Vth is the threshold value provided to check whether the secondary battery 22 is capable of supplying power, which is sufficient to charge the secondary battery 31.

Figure 7:
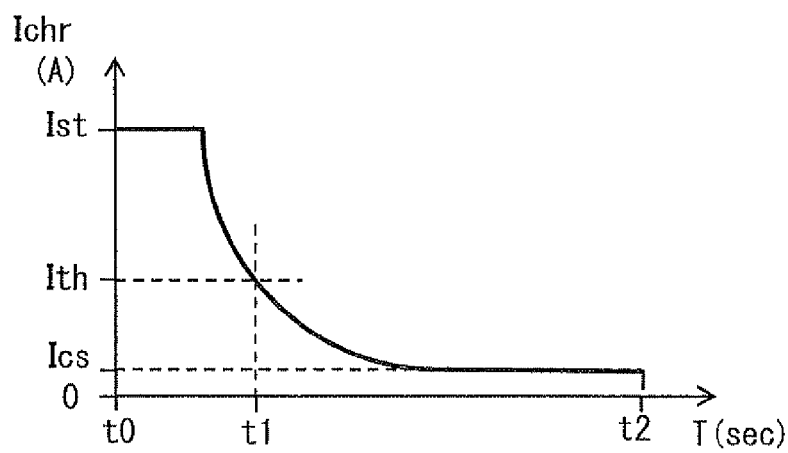
FIG. 7 is a graph showing a charging current in the first embodiment.

The charging current Ichr starts to flow from time t0 as shown in FIG. 7. At time t0, the charging current Ichr is an initial current Ist. The insulating circuit performs charging from time t0 to time U. The insulating circuit performs charging when the charging current Ichr falls below the threshold current Ith at time t1. The threshold current Ith corresponds to the switching condition. The threshold current Ith is a threshold value provided to separate the former period of charging and the latter period of charging. In the latter period of charging, the secondary battery 31 is supplied with a latter-period current Ics, which is much smaller than the initial current Ist.

Figure 8:
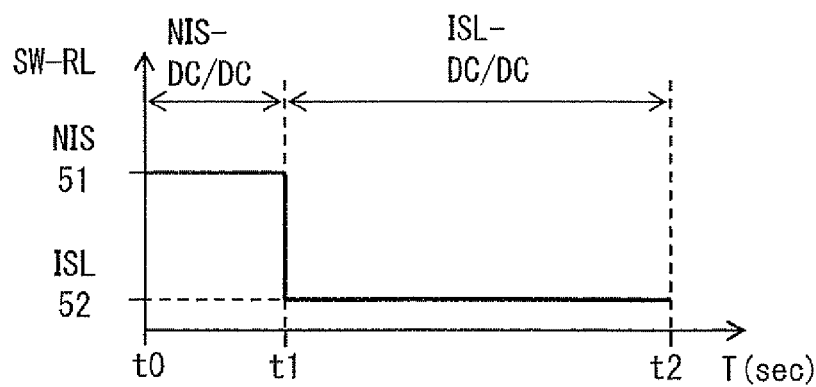
FIG. 8 is a graph showing a switching state of a charging circuit in the first embodiment.

A switching state of the charging circuit 4 in the first embodiment is shown in FIG. 8. In the figure, the axis of ordinate indicates switched state of the switching relay 53. The non-insulating circuit state (NIS) and the insulating circuit state (ISL) are provided. Charging is performed from time t0 to time t1 by the non-insulating converter circuit (NIS-DC/DC) 51. Charging is performed from time t1 to time t2 by the insulating converter circuit (ISL-DC/DC) 52.

According to the first embodiment, the power supply from the commercial power line system 23 to the non-insulating converter circuit 51 is shut off when the DC power is supplied by the non-insulating converter circuit 51. The non-insulating converter circuit 51 therefore receives the power from the power source devices 21 and 22 other than the commercial power line system 23 and supplies the DC power. The non-insulating converter circuit 51 thus exhibits its higher power conversion efficiency than the insulating converter circuit 52, which is insulated by the insulating transformer 52a. As a result, the high power conversion efficiency can be exhibited in supplying the DC power by the non-insulating converter circuit 51. Since the commercial power line system 23 is disconnected, adverse effect of the stray capacitance at the output side of the non-insulating converter circuit 51 is minimized.

The power is supplied from only the power source devices 21 and 22 other than the commercial power line system 23 to the non-insulating converter circuit 51 when the DC power is supplied by the non-insulating converter circuit 51. The non-insulating converter circuit 51 therefore can exhibit its high power conversion efficiency while minimizing adverse effect caused by the stray capacitance at the output side of the non-insulating converter circuit 51. The power supplied from the commercial power line system 23 is converted only by the insulating converter circuit 52. As a result, adverse effect of the stray capacitance at the output side of the insulating converter circuit 52 is minimized.

The commercial power line system 23 and the charging circuit 4 are disconnected by the breaker relay 46 when the secondary battery 31 is charged through the non-insulating converter circuit 51. As a result, the power supplied by the commercial power line system 23 is prevented from leaking to ground through the stray capacitance STCV formed in the vehicle. The power can be supplied through the non-insulating converter circuit 51, in which no insulating transformer is provided. As a result, the power conversion efficiency can be improved than in a case, in which the power is supplied through only the insulating converter circuit 52 having the insulating transformer 52a.

The non-insulating converter circuit 51 or the insulating converter circuit 52 can be selected so that the charging circuit 4 is switched to operate as the non-inverting circuit or the inverting circuit based on whether the predetermined switching condition is satisfied. If the predetermined switching condition is not satisfied, the DC power is supplied only by the insulating converter circuit 52 and hence the commercial power line system 23 can be insulated from the load device 3.

High power conversion efficiency is used by the non-insulating converter circuit 51 in the former period of charging of the secondary battery 31. Further, adverse effect caused by the stray capacitance is avoided by the insulating converter circuit 52. The threshold condition for dividing the charging period into the former period and the latter period may be set by the index, which indicates the time measured by the timer device from the start of charging or the charging current to the secondary battery. For example, the predetermined condition may be set to correspond to that the time measured from the start of charging is shorter than the predetermined time or the charging current is larger than the predetermined value.

High power conversion efficiency of the non-insulating converter circuit 51 is used when the power supply capability of the power source devices 21 and 22 other than the commercial power line system 23 is high. In addition, the adverse effect caused by the stray capacitance is reduced by the insulating converter circuit 52 when the power supply capability of the power source devices 21 and 22 other than the commercial power line system 23 is low. The threshold for indicating the capability of power supply may be set based on the output voltage V22 of the power source device 22 as the index. For example, the predetermined condition may be set to correspond to that the output voltage of the power source device 22 is higher than the predetermined voltage. Alternatively, the threshold may be set based on the state of charge (SOC) of the storage battery, which is determined by integration of the charging and discharging current or by coulomb counting method.

The charging power is supplied through the non-insulating converter circuit 51 when the charging current flowing to the secondary battery 31 is large. The charging power is supplied only through the insulating converter circuit 52 when the charging current flowing to the secondary battery 31 is reduced. As a result, a large charging current can be supplied with high efficiency. The conversion efficiency of entire power needed for charging can be enhanced efficiently. While the charging current is small, the advantage of the insulating converter circuit 52 can be utilized. For example, when the secondary battery 31 is charged only through the insulating converter circuit 52, the primary side and the secondary side of the insulating transformer 52a is insulated by separation. As a result, the power of the commercial power line system 23 is prevented from ground leakage of current through the stray capacitance STCS.

The non-insulating converter circuit 51 and the insulating converter circuit 52 are provided as separate circuits in the charging circuit 4. These circuits are connected selectively to the load device 3.

Second Embodiment

Figure 9:
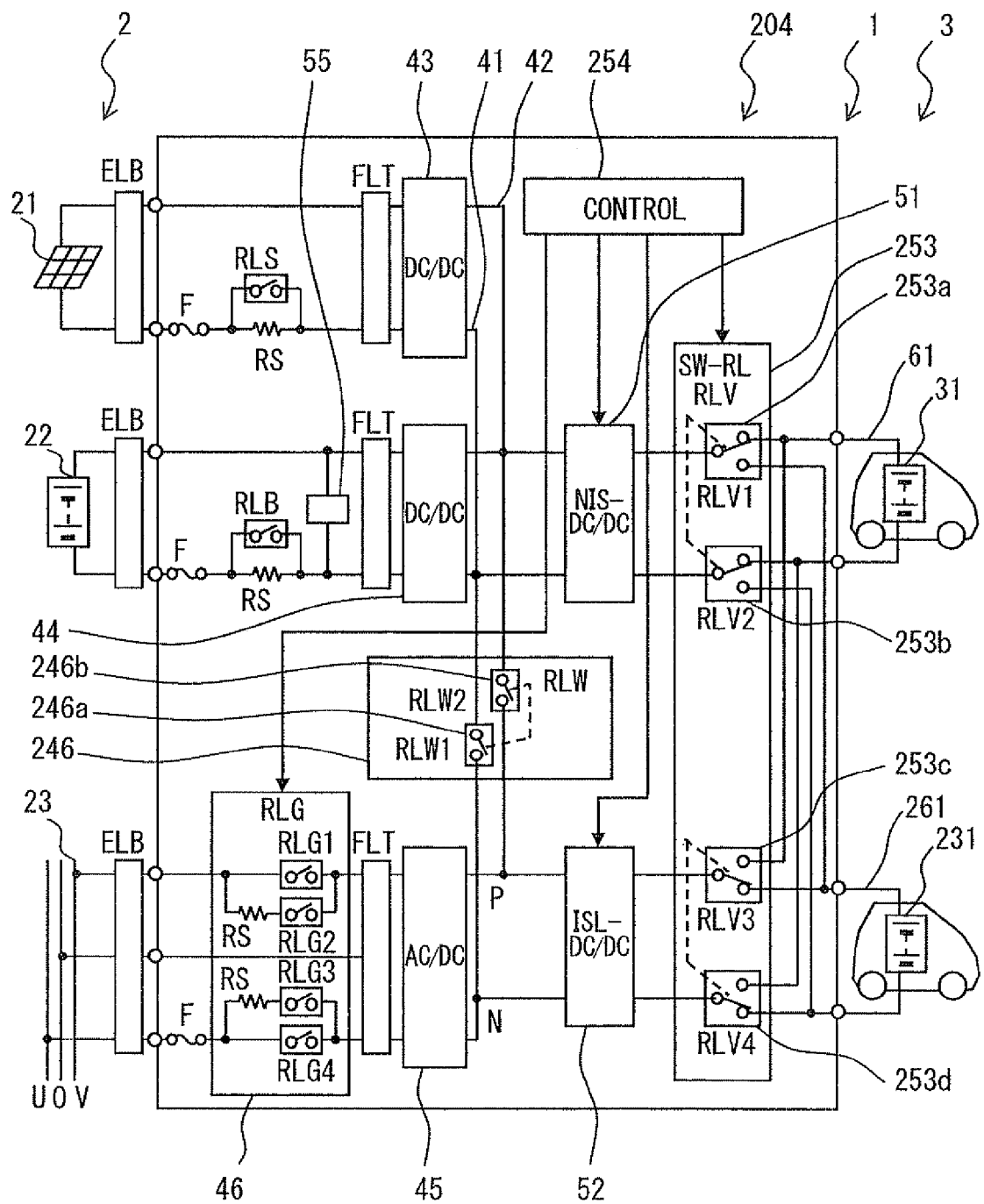
FIG. 9 is a block diagram of a charging system including a DC power supply apparatus according to a second embodiment.

In a DC power supply apparatus according to a second embodiment, as shown in FIG. 9, a charging circuit (conversion circuit) 204 is configured to charge secondary batteries 31 and 231 of two vehicles at the same time. The charging circuit 204 includes first cables 61 and second cables 261.

A switching relay (SW-RL) 253 includes single-throw double-pole relays (RLV1, RLV2, RLV3 and RLV4) 253a, 253b, 253c and 253d, which form the system relay RLV. The relays 253a, 253b, 253c and 253d connect the non-insulating converter circuit 51 and the insulating converter circuit 52 switchably to the first cables 61 and the second cables 261. The relays 253a, 253b, 253c and 253d connect the insulating converter circuit 52 and the second cables 261 when the insulating converter circuit 52 is connected to the first cables 61. The relays 253a, 253b, 253c and 253d connect the non-insulating converter circuit 51 and the second cables 261 when the insulating converter circuit 52 is connected to the first cables 61.

The charging circuit 204 includes a breaker relay (RLW) 246 as a separating device for separating charging circuits 45, 46 and 52 including the commercial power line system 23 from the charging circuits 43, 44 and 51 including only the power source device 2 other than the commercial power line system 23. The breaker relay 246 includes a breaker relay (RLW1) 246a and a breaker relay (RLW2) 246b. The breaker relay 246a is provided in the negative line 41 to connect and disconnect the negative line 41. The breaker relay 246b is provided in the positive line 42 to connect and disconnect the negative line 41. The breaker relays 246a and 246b charge the secondary battery 31 by the non-insulating converter circuit 51 and are driven to the OFF-state when the secondary battery 331 is charged by the insulating converter circuit 52. The breaker relays 246a and 246b are driven to the ON state when the power of the commercial power line system 23 is charged to the secondary battery 22 and 31. The breaker relays 246a and 246b are driven to the ON state when power of the power source devices 2 other than the commercial power line system 23 is supplied to the battery 231. The breaker relays 246a and 246b are also driven to the ON state when the power of the secondary power source devices 31 is supplied to the secondary battery 231. The breaker relays 246a and 246b form a breaker device for shutting off the power supply from the commercial power line system 23 to the non-insulating converter circuit 51.

A control circuit 254 is configured to perform charging processing for only one of the secondary battery 31 and the secondary battery 231 by controlling the switching relay 253 in the similar way as in the first embodiment. The control circuit 254 drives the breaker relays 246a and 246b to the ON states.

The control circuit 254 performs processing of charging the two batteries 31 and 231 at the same time. The control circuit 254 charges the secondary battery 31 only through the non-insulating converter circuit 51 and at the same charges the secondary battery 331 only through the insulating converter circuit 52. The control circuit 54 charges the secondary battery 31 only through the insulating converter circuit 52 and at the same charges the secondary battery 331 only through the non-insulating converter circuit 51. The control circuit 254 drives the breaker relays 246a and 246b to the OFF states when both of the second batteries 31 and 231 are charged at the same time. The breaker relays 246a and 246b thus disconnect the charging circuit including the non-insulating converter circuit 51 from the commercial power line system 23. When the charging circuit 204 supplies the DC power by the non-insulating converter circuit 51, the breaker relay 246 operates as a breaker device, which shuts off power supply from the commercial power line system 23 to the non-insulating converter circuit 51. As a result, adverse effect, which the stray capacitance of the circuit including the secondary battery 31 influences the commercial power line system 23 is reduced. The circuit including the secondary battery 331 is separated from the commercial power line system 23 by the insulating converter circuit 52. As a result, the influence of the stray capacitance of the circuit including the secondary battery 231 is reduced.

According to the second embodiment, the charging circuit 204 includes the non-insulating converter circuit 51 and the insulating converter circuit 52 as independent circuits. The switching relay 253 forms a switching device, which connect either one of the non-insulating converter circuit 51 and the insulating converter circuit 52 selectively to the load device 3. The switching device 253 connects the non-insulating converter circuit 51 and the insulating converter circuit 52 to the plural load devices 31 and 231 switchably.

The DC power can be supplied to the plural load devices 31 and 231 by the non-insulating converter circuit 51 and the insulating converter circuit 52.

Third Embodiment

Figure 10:
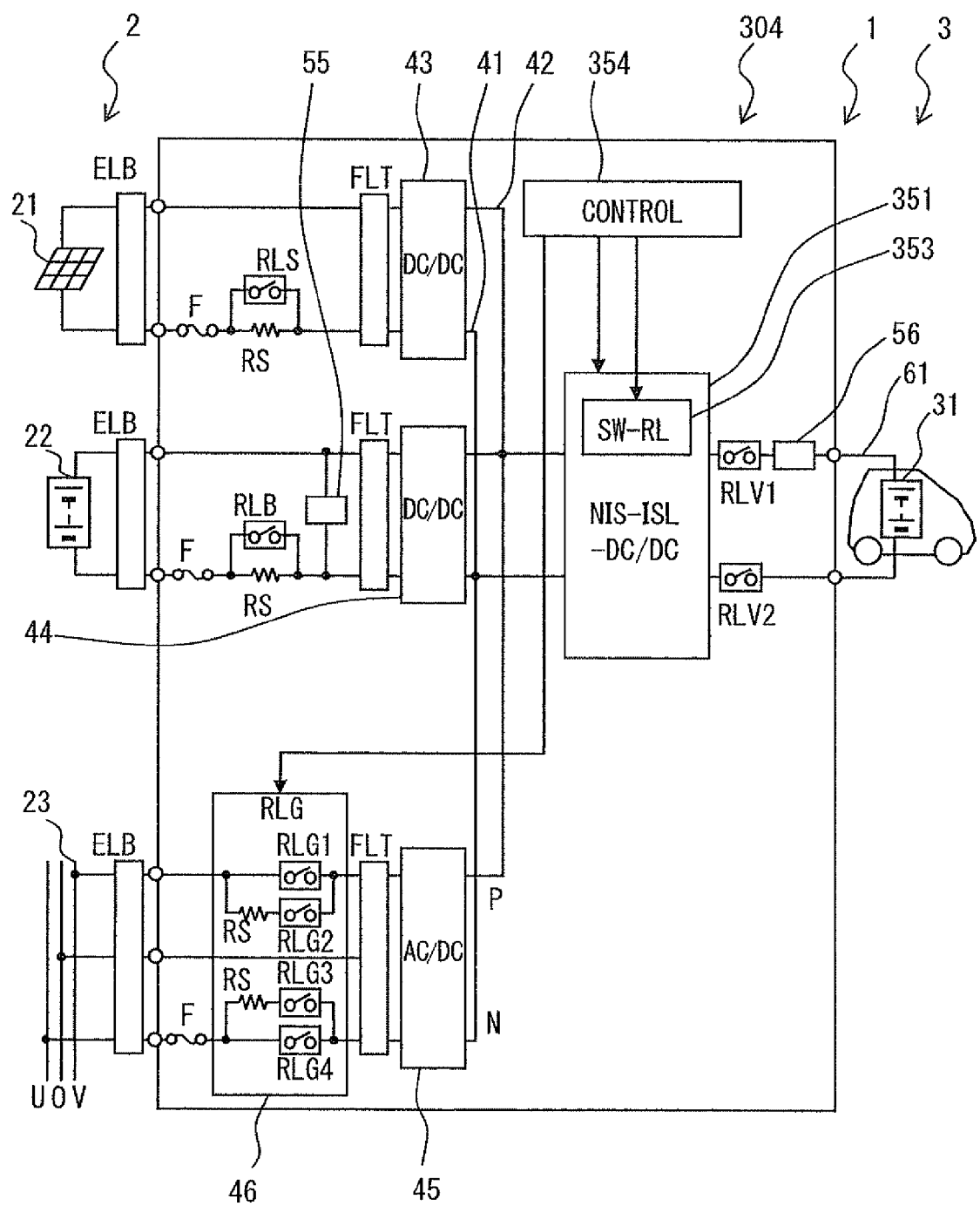
FIG. 10 is a block diagram of a charging system including a DC power supply apparatus according to a third embodiment.

In a DC power supply apparatus according to a third embodiment, as shown in FIG. 10, a charging circuit (conversion circuit) 304 includes a switchable converter circuit 351 in place of the non-insulating converter circuit 51 and the insulating converter circuit 52, which are provided in the first and the second embodiments. The switchable converter circuit 351 is selectively switchable to a non-insulating circuit and an insulating circuit. The switchable converter circuit 351 is a switchable DC power conversion circuit (NIS-ISL-DC/DC). The switchable converter circuit 351 includes a part, which is provided as the insulating converter circuit, and a switching relay (SW-RL) 353, which is provided as a switching device. The system relay RLV includes two relays RLV1 and RLV2. A control circuit 354 controls the breaker relay 46 to disconnect the commercial power line system 23 from the charging circuit 304 and also controls the switching relay 353 to switch over the switchable converter circuit 351 to either one of the non-insulating circuit and the insulating circuit.

Figure 11:
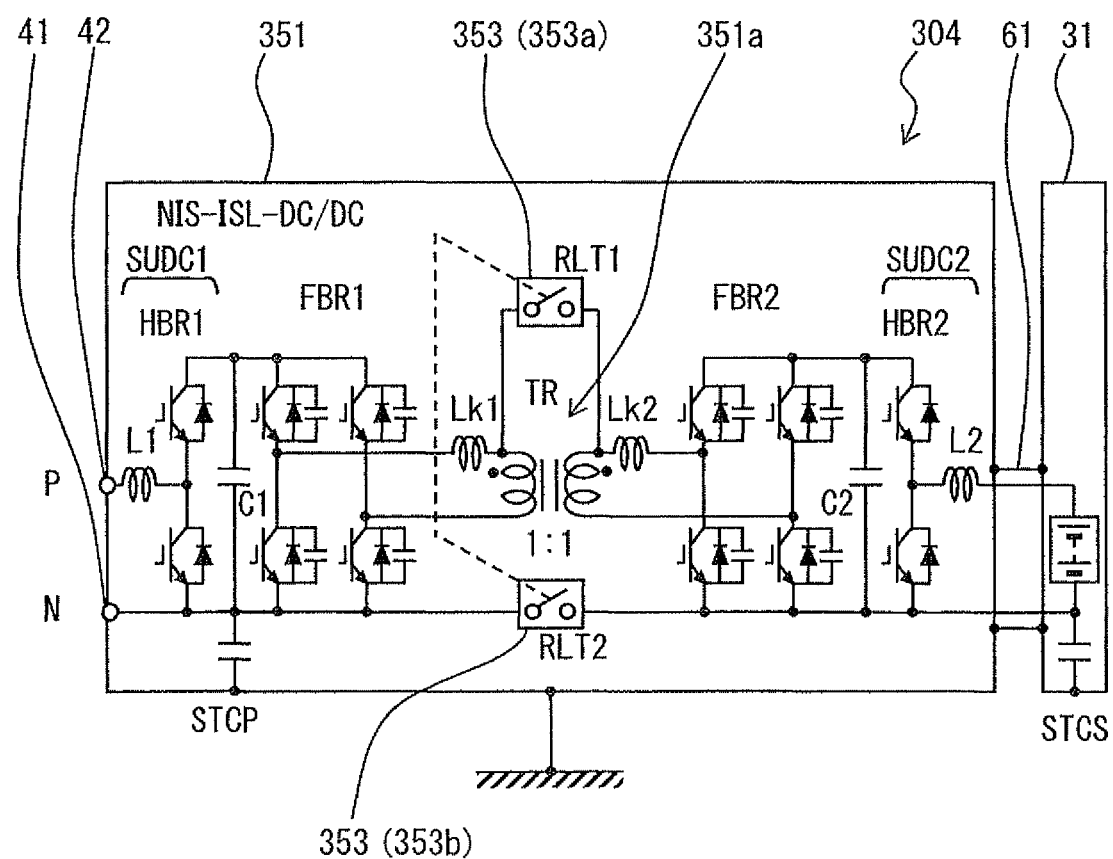
FIG. 11 is a circuit diagram of a switching type DC power conversion circuit in the third embodiment.

The switchable converter circuit 351 is configured as shown in FIG. 11. The switchable converter circuit 351 includes circuits, which are provided symmetrically as a two-way step-up/down converter circuit. The switchable converter circuit 351 is a step-up/down converter circuit, which supplies a voltage stepped up or stepped down from the voltage of the power lines to charge the secondary battery 31. The switchable converter circuit 351 may alternatively be formed of only a step-up converter circuit or a step-down converter circuit. The switchable converter circuit 351 includes an insulating transformer (TR) 351a, a first full-bridge circuit FBR1 provided at the primary side of the insulating transformer 351a and a second full-bridge circuit FBR2 provided at the secondary side of the insulating transformer 351a.

The full-bridge circuit FBR1 supplies an AC current to the primary coil of the insulating transformer 351a. The full-bridge circuit FBR2 supplies an AC current to the secondary coil of the insulating transformer 351a. A smoothing capacitor C1 is provided at a DC side of the full-bridge circuit FBR1. A smoothing capacitor C2 is provided at a DC side of the full-bridge circuit FBR2. Each of the full-bridge circuits FBR1 and FBR2 is formed of bridge-connected four switching elements.

In case that the switchable converter circuit 351 is the insulating circuit, plural switching elements of one of the full-bridge circuits FBR1 and FBR2, which is provided at the input side, are switching-controlled to convert the DC power to the AC power and supply the AC power to the insulating transformer 351a. The AC power is voltage-converted by the insulating transformer 351a. Further, plural switching elements of the other of the full-bridge circuits FBR1 and FBR2, which is provided at the output side, are switching-controlled to convert the AC power to the DC power and output the DC power. In case that the switchable converter circuit 351 is the non-insulating circuit, the plural switching elements of the full-bridge circuits FBR1 and FBR2 are switching-controlled to perform voltage conversion by the step-up/down converter circuit formed by the full-bridge circuits FRB1, FRB2 and the insulating transformer 351a.

The switchable converter circuit 351 includes the switching relay 353 as a switching device, which switches over the circuit 353 to either the insulating circuit or the non-insulating circuit. The switching relay 353 includes the relay (RLT1) 353a, which is capable of connecting and disconnecting the winding start end of the primary coil of the insulating transformer 351a and the winding start end of the secondary coil of the insulating transformer 351a. The relay 351 includes the relay (RLT) 353b, which is capable of connecting and disconnecting ground lines of the full-bridge circuits FBR1 and FBR2. When the relay 353 is open, that is, both of the relays 353a and 353b are open, the primary side terminal and the secondary side terminal of the insulating transformer 351a are disconnected and the ground lines of the full-bridge circuits FBR1 and the FBR2 are also disconnected. In this instance, the insulating transformer 351a is capable of operating as a normal insulating transformer. That is, when the switching relay 353 is open, the insulating circuit, which is insulated by the insulating transformer 351, is formed. When the relay 353 is closed, that is, both of the relays 353a and 353b are closed, the primary side terminal and the secondary side terminal of the insulating transformer 351a are shorted and the ground lines of the full-bridge circuits FBR1 and the FBR2 are connected. That is, when the switching relay 353 is closed, the non-insulating circuit, which is not electromagnetically-coupled by the insulating transformer 351, is formed.

The relay 353 is arranged so that leak inductances Lk1 and Lk2 are provided in series between the full-bridge circuit FBR1 and the full-bridge circuit FBR2 with the relays 353a and 353b being closed. With the switching relay 353 being closed, the leak inductances Lk1, Lk2 and the switching arms of the full-bridge circuits FBR1, FBR2 connected to the leak inductances Lk1, Lk2 form the non-insulating converter circuit, which includes a step-down chopper circuit and a step-up chopper circuit. For example, when the secondary battery 31 is charged from the secondary battery 22, the leak inductances Lk1, Lk2 and one switching arm of the full-bridge circuit FBR1 connected to the leak inductances Lk1, Lk2 form the step-down chopper circuit. In this case, the leak inductances Lk1, Lk2 and one switching arm of the full-bridge circuit FBR2 connected to the leak inductances Lk1, Lk2 form the step-up chopper circuit.

The switchable converter circuit 351 includes at its both ends step-up/down converter circuit SUDC1 and SUDC2. The step-up/down converter circuit SUDC1 is provided at the DC side of the full-bridge circuit FBR1. The step-up/down converter circuit SUDC2 is provided at the DC side of the full-bridge circuit FBR2. The step-up/down converter circuit SUDC1 includes a reactor L1 and the half-bridge circuit HBR1. The step-up/down converter circuit SUDC1 supplies a voltage stepped up or stepped down, when switching elements of the half-bridge circuit HBR1 are switching-controlled. It is possible to provide this function by the converter circuits 43, 44 and 45 without providing the step-up/down converter circuit SUDC1. The step-up/down converter circuit SUDC2 includes a reactor L2 and the half-bridge circuit HBR2. The step-up/down converter circuit SUDC2 supplies a voltage stepped up or stepped down, when switching elements of the half-bridge circuit HBR2 are switching-controlled.

According to the third embodiment, a turn ratio of the primary coil and the secondary coil of the insulating transformer 351a is 1 (1:1). The insulating transformer 351a and the full-bridge circuits FBR1, RBR2 form a step-down type insulating converter circuit. The step-down type insulating converter circuit, which is formed of the insulating transformer 351a and the full-bridge circuits FBR1, FBR2, and the circuits SUD1, SUDC2 performs conversion between the voltage of the DC power lines and the voltage of the secondary battery 31.

A casing of the charging circuit 304 including the switchable converter circuit 351 is grounded. When the switchable converter circuit 351 is connected to the secondary battery 31, a stray capacitance STCP is formed in a circuit connected to the primary side of the insulating transformer 351a. A stray capacitance STCS is formed in a circuit including the battery 3 and connected to the secondary side of the insulating transformer 351. Since the insulating transformer 351a insulates its primary side and secondary side, the current in the primary side is prevented from directly flowing through the stray capacitance STCS.

The efficiency of power conversion of the non-insulating circuit in charging the secondary battery 31 is higher than that of the insulating circuit in charging the secondary battery 31. That is, the switchable converter circuit 351 is configured to exhibit the higher power conversion efficiency by the non-insulating circuit than by the insulating circuit.

Figure 12:
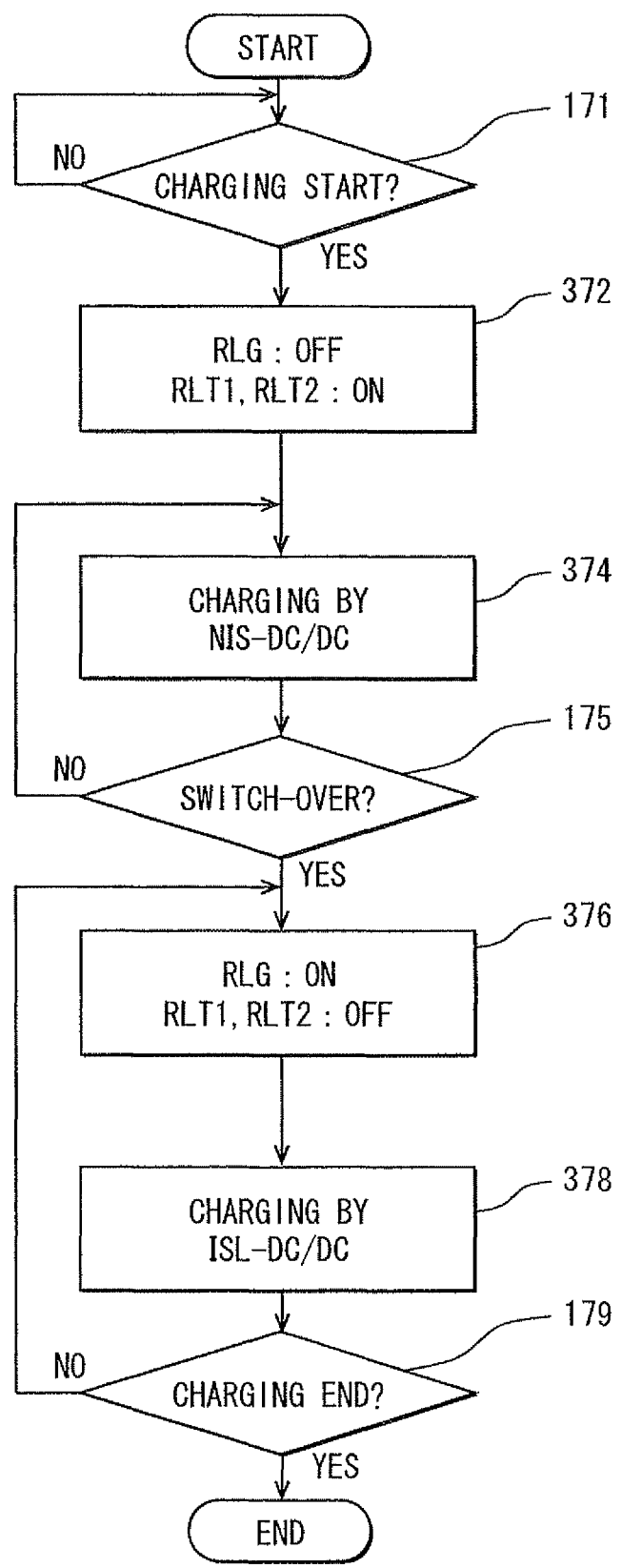
FIG. 12 is a flowchart showing an operation performed by a control circuit in the third embodiment.

The control circuit 354 in the charging circuit 304 is configured to perform switching control processing shown in FIG. 12. The control circuit 354 executes the processing repeatedly every predetermined cycle.

At step 171, it is checked whether charging the secondary battery 31 is to be started. At step 372, the breaker relay (RLG) 46 is driven to the OFF state. Further, the switching relay 353 is driven to the non-insulated (NIS) state. That is, the relays (RLT1, RLT2) 353a, 353b are driven to the ON state. Thus, the primary side and the secondary side of the insulating transformer 351a are shorted. As a result, the charging circuit 4 operates as only the non-insulating circuit. At step 374, the non-insulating circuit performs charging. That is, the non-insulating circuit formed by the switchable converter circuit 351 is controlled to charge the secondary battery 31. Here, the control circuit 354 controls the step-up/down converter circuit SUDC1 so that the stepped-up voltage is supplied to the full-bridge circuit FBR1 from the voltage of the DC power lines, that is, the voltage of the secondary battery 22. The control circuit 354 controls the plural switching elements of the full-bridge circuits FBR1 and FBR2 so that the leak inductances Lk1, Lk2 and the switching arms of the full-bridge circuits FBR1, FBR2 connected to the leak inductances Lk1, Lk2 operate as the non-insulating converter circuit. The control circuit 354 further controls the step-up/down converter circuit SUDC2 so that the DC voltage supplied from the full-bridge circuit FBR2 is supplied after conversion to a voltage suitable for charging the secondary battery 31.

At step 175, it is checked whether a predetermined switching condition is satisfied. Step 374 is repeated until the switching condition is satisfied at step 175. Thus, the non-insulating circuit continues to perform the charging operation. Step 376 is executed when the switching condition is satisfied.

At step 376, the breaker relay (RLG) 46 is driven to the ON state. Further, the switching relay (SW-RL) 353 is driven to the insulated (ISL) state. That is, the relays (RLT1, RLT2) 353a, 353b are driven to the OFF state. Thus, the charging circuit 4 operates as only the insulating circuit. At step 378, the insulating circuit performs charging. That is, the insulating circuit formed by the switchable converter circuit 351 is controlled to charge the secondary battery 31. Here, the control circuit 354 controls the step-up/down converter circuit SUDC1 so that the stepped-up voltage is supplied from the voltage of the DC power lines, that is, from the voltage of the secondary battery 22. The control circuit 354 controls the full-bridge circuit FBR1 by phase-shift PWM method so that a zero-volt switching (ZVS) is performed. In the phase-shift PWM control method, the plural switching elements of the full-bridge circuit FBR1 are turned on and off at a duty ratio of 50%. The phase-shift PWM control method controls a shift time between two switching timings, that is, one switching timing of a pair of switching elements which supplies current to the primary coil of the insulating transformer 351a in the forward direction and the other switching timing of a pair of switching elements which supplies current to the primary coil of the insulating transformer 351a in the reverse direction. Thus, the forward current supply period and the reverse current supply period are controlled. In this instance, the voltage resonates due to an inductive component of the insulating transformer 351a including the leak inductances Lk1, Lk2 and a capacitive component including capacitors formed in parallel to the plural switching elements.

When the voltage between both terminals of the switching element becomes zero due to resonance, the switching element is switching-controlled. For example, when the terminal voltage becomes zero, the switching element is controlled from the OFF state to the ON state. By the ZVS operation, a crossing time of current and voltage at the switching edge is reduced and hence switching loss is reduced. When power is supplied from the full-bridge circuit FBR1 to the full-bridge circuit FBR2, resonance caused by the leak inductance Lk1 and the capacitor of the switching element of the full-bridge circuit FBR1 is used. When power is supplied from the full-bridge circuit FBR2 to the full-bridge circuit FBR1, resonance caused by the leak inductance Lk2 and the capacitance of the switching element of the full-bridge circuit FBR2 is used. The control circuit 354 controls the full-bridge circuit FBR2 so that the AC power supplied from the insulating transformer 351a is converted to the DC power and the DC power is supplied to the step-up/down converter circuit SUDC2. The control circuit 354 also controls the step-up/down converter circuit SUDC2 so that the DC power supplied from the full-bridge circuit FBR2 is converted to the voltage suitable for charging the secondary battery 31 and the voltage is supplied.

At step 179, it is checked whether the charging of the secondary battery 31 has been ended. Step 376 is executed again if the charging of the secondary battery 31 has not been finished yet. Thus, the insulating circuit continues to perform the charging operation. The switching control processing 370 is finished when the charging of the secondary battery 31 is finished.

According to the third embodiment, the switching device 353 is provided to close or open the primary terminal and the secondary terminal of the insulating transformer 351a and to close or open the negative-side potential line of the first full-bridge circuit FBR1 and the negative potential line of the second full-bridge circuit FBR2. The switchable converter circuit 351 is provided to switch over to the non-insulating converter circuit or to the insulating converter circuit in correspondence to closing or opening of the switching device 353. Thus, the switchable converter circuit 351 forms the insulating converter circuit and the non-insulating converter circuit.

The non-insulating converter circuit and the insulating converter circuit can be provided by using the switching elements of the first full-bridge circuit FRB1 and the second full-bridge circuit FRB2. The non-insulating converter circuit is a step-up converter circuit formed by the first bridge circuit FBR1, the second full-bridge circuit FBR2 and the inductive components Lk1, Lk2 of the insulating transformer 351a, which is formed when the switching device 353 is in the shorted state. As a result, the step-up/down converter circuit, which operates as the non-insulating converter circuit, can be provided by the inductive component of the insulating transformer 351a provided when the switching device 353 is in the shorted state.

Fourth Embodiment

Figure 13:
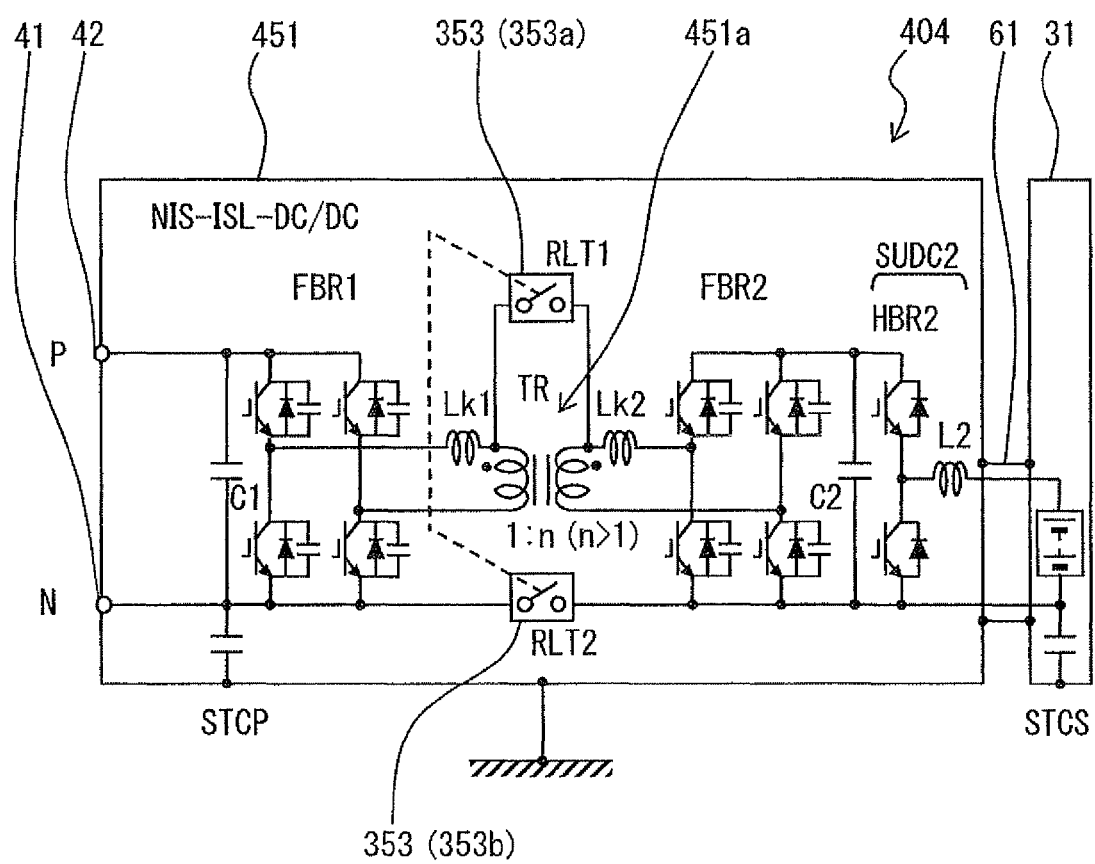
FIG. 13 is a circuit diagram of a switching type DC power conversion circuit in a fourth embodiment.

In a DC power supply apparatus according to a fourth embodiment, as shown in FIG. 13, a charging circuit (conversion circuit) 404 is configured to include a switchable DC power converter circuit 451. The switchable converter circuit 451, which is switchable selectively to a non-insulating circuit and an insulating circuit. The converter circuit 451 includes an insulating transformer 451a, which insulates the primary side and the secondary side. The turn ratio of the primary coil and the secondary coil of the insulating transformer 451a is n (1:n, n>1). The insulating transformer 451a converts the voltage supplied from the full-bridge circuit FBR1 by multiple-folds (n) and supplies it to the full-bridge circuit FBR2. As a result, the insulating transformer 451a and the full-bridge circuits FBR1, FBR2 form a step-up type insulating converter circuit.

According to the fourth embodiment, only the step-up/down converter circuit SUDC2 is provided. When the secondary battery 31 is charged, the voltage of the DC power lines is stepped up by the insulating transformer 451a and then regulated by the step-up/down converter circuit SUDC2 to a voltage suitable for charging the secondary battery 31. When power is supplied from the secondary battery 31 to the DC power lines in reverse, the voltage is stepped up by the step-up/down converter circuit SUDC2, and then stepped down by the insulating transformer 451a to a fraction of multiple (1/n) and supplied to the DC power lines.

According to the fourth embodiment, not only the insulating function but also the transforming function of the insulating transformer 451a can be utilized.

Other Embodiments

Although the DC power supply apparatus is described with reference to the preferred embodiments, it may be implemented in other modified forms.

For example, in the embodiments described above, only the non-insulating converter circuit 51 is activated and rendered operable in the non-insulating circuit. Instead, the insulating converter circuit 52 may as well be activated and rendered operable in the non-insulating circuit. As a result, the charging current to the secondary battery 31 can be increased. In such a modification, only the insulating converter circuit 52 is activated and rendered operable in the insulating circuit. Thus, in the non-insulating circuit, power conversion efficiency can be improved by additionally using the non-insulating converter circuit 51. Further, in the insulating circuit, advantage of using the insulating converter circuit 52 can be provided.

For example, the switching device and the breaker device are formed by relays in the embodiments described above. Alternatively, the switching device and the breaker device may be formed by semiconductor switches.

For example, structure and function provided by the control circuit may be provided by only software, hardware or combination of software and hardware. The control circuit may be formed as an analog circuit.

What is claimed is:

1. A DC power supply apparatus for converting power supplied from a power source device including a commercial power line system and supplying DC power to a load device, the DC power supply apparatus comprising:
   a conversion circuit configured to supply the DC power and including an insulating transformer, the conversion circuit being switchable to operate as a non-insulating converter circuit, in which an input and an output is not insulated by the insulating transformer, or as an insulating converter circuit, in which the input and the output are insulated by the insulating transformer; and
   a breaker device for shutting off power supply from the commercial power line system to the non-insulating converter circuit, when the conversion circuit supplies the DC power by the non-insulating converter circuit.

2. The DC power supply apparatus according to claim 1, wherein:
   the breaker device shuts off the power supply from the commercial power line system to the non-insulating converter circuit and allows the power supply only from the power source device other than the commercial power line system to the non-insulating converter circuit, when the conversion circuit supplies the DC power by the non-insulating converter circuit; and
   the breaker device allows the power supply from the commercial power line system to the insulating converter circuit and allows only the insulating converter circuit to convert the power supplied from the commercial power line system, when the conversion circuit supplies the DC power by the insulating converter circuit.

3. The DC power supply apparatus according to claim 2, wherein:
   the conversion circuit supplies the DC power by the non-insulating converter circuit, when a predetermined condition is satisfied; and the conversion circuit supplies the DC power by only the insulating converter circuit, when the predetermined condition is not satisfied.

4. The DC power supply apparatus according to claim 3, wherein:
the conversion circuit is a charging circuit for charging the DC power to a secondary battery provided as the load device;
the predetermined condition is set based on a charging period for the secondary battery; and
the conversion circuit supplies the DC power by the non-insulating converter circuit in a former period of a charging period for the secondary battery, and supplies the DC power by the insulating converter circuit in a latter period of the charging period for the secondary battery.

5. The DC power supply apparatus according to claim 3, wherein:
the predetermined condition is set based on a magnitude of power supply capability of the power source device other than the commercial power line system;
the conversion circuit supplies the DC power by the non-insulating converter circuit when the power supply capability is higher than a predetermined threshold value, and supplies the DC power by the insulating converter circuit when the power supply capability is lower than the predetermined threshold value.

6. The DC power supply apparatus according to claim 2, wherein:
the conversion circuit includes the non-insulating converter circuit, the insulating converter circuit and a switching device for selectively connecting either one of the non-insulating converter circuit and the insulating converter circuit to the load device.

7. The DC power supply apparatus according to claim 6, wherein:
the switching device connects the non-insulating converter circuit and the insulating converter circuit to plural load devices exchangeably.

8. The DC power supply apparatus according to claim 2, wherein the conversion circuit includes:
a first full-bridge circuit provided at a primary side of the insulating transformer;
a second full-bridge circuit provided at a secondary side of the insulating transformer;
a switching device for connecting or disconnecting a primary terminal and a secondary terminal of the insulating transformer, and connecting and disconnecting a negative line of the first full-bridge circuit and a negative line of the second full-bridge circuit; and
a switchable converter circuit switchable to the non-insulating converter circuit or the insulating converter circuit by the switching device.

9. The DC power supply apparatus according to claim 8, wherein:
the non-insulating converter circuit is a step-up/down converter circuit, which is formed of an inductive component of the insulating transformer provided in a connected state of the switching device, the first full-bridge circuit and the second full-bridge circuit.

10. The DC power supply apparatus according to claim 1, wherein:
the conversion circuit supplies the DC power by the non-insulating converter circuit, when a predetermined condition is satisfied; and
the conversion circuit supplies the DC power by only the insulating converter circuit, when the predetermined condition is not satisfied.

11. The DC power supply apparatus according to claim 10, wherein:
the conversion circuit is a charging circuit for charging the DC power to a secondary battery provided as the load device;
the predetermined condition is set based on a charging period for the secondary battery; and
the conversion circuit supplies the DC power by the non-insulating converter circuit in a former period of a charging period for the secondary battery, and supplies the DC power by the insulating converter circuit in a latter period of the charging period for the secondary battery.

12. The DC power supply apparatus according to claim 10, wherein:
the predetermined condition is set based on a magnitude of power supply capability of the power source device other than the commercial power line system;
the conversion circuit supplies the DC power by the non-insulating converter circuit when the power supply capability is higher than a predetermined threshold value, and supplies the DC power by the insulating converter circuit when the power supply capability is lower than the predetermined threshold value.

13. The DC power supply apparatus according to claim 10, wherein:
the conversion circuit includes the non-insulating converter circuit, the insulating converter circuit and a switching device for selectively connecting either one of the non-insulating converter circuit and the insulating converter circuit to the load device.

14. The DC power supply apparatus according to claim 10, wherein the conversion circuit includes:
a first full-bridge circuit provided at a primary side of the insulating transformer;
a second full-bridge circuit provided at a secondary side of the insulating transformer;
a switching device for connecting or disconnecting a primary terminal and a secondary terminal of the insulating transformer, and connecting and disconnecting a negative line of the first full-bridge circuit and a negative line of the second full-bridge circuit; and
a switchable converter circuit switchable to the non-insulating converter circuit or the insulating converter circuit by the switching device.

15. The DC power supply apparatus according to claim 1, wherein:
the conversion circuit includes the non-insulating converter circuit, the insulating converter circuit and a switching device for selectively connecting either one of the non-insulating converter circuit and the insulating converter circuit to the load device.

16. The DC power supply apparatus according to claim 15, wherein:
the switching device connects the non-insulating converter circuit and the insulating converter circuit to plural load devices exchangeably.

17. The DC power supply apparatus according to claim 1, wherein the conversion circuit includes:
a first full-bridge circuit provided at a primary side of the insulating transformer;
a second full-bridge circuit provided at a secondary side of the insulating transformer;
a switching device for connecting or disconnecting a primary terminal and a secondary terminal of the insulating transformer, and connecting and disconnecting a negative line of the first full-bridge circuit and a negative line of the second full-bridge circuit; and a switchable converter circuit switchable to the non-insulating converter circuit or the insulating converter circuit by the switching device.

18. The DC power supply apparatus according to claim 17, wherein:

the non-insulating converter circuit is a step-up/down converter circuit, which is formed of an inductive component of the insulating transformer provided in a connected state of the switching device, the first full-bridge circuit and the second full-bridge circuit.

19. A DC power supply method for supplying a secondary battery of a vehicle with DC power to charge the secondary battery by a conversion circuit, which includes an insulating transformer for insulating primary side and a secondary side thereof and converts power of a DC power source device and a commercial AC power source device, the DC power supply method comprising:

checking whether the secondary battery is to be charged;

setting the conversion circuit to operate as a non-insulating converter circuit, in which the insulating transformer is inoperative, when the secondary battery is determined to be charged;

disconnecting the non-insulating converter circuit and the AC power source device from each other, when the conversion circuit is set to operate as the non-insulating converter circuit, charging the secondary battery initially by using only the DC power of the DC power source device by only the non-insulating converter circuit of the conversion circuit;

checking whether a predetermined switch-over condition is satisfied, the predetermined switch-over condition indicating that the secondary battery has been charged initially;

setting the conversion circuit to operate as an insulating converter circuit, in which the insulating transformer is operative, after the predetermined switch-over condition is satisfied;

connecting the insulating converter circuit and the AC power source device, when the conversion circuit is set to operate as the insulating converter circuit; and charging the secondary battery by using only the insulating converter circuit of the conversion circuit.

20. The DC power supply method according to claim 19, further comprising:

connecting a primary terminal and a secondary terminal of the insulating transformer in a period of initial charging of the secondary battery so that the conversion circuit operates as the non-insulating converter circuit; and disconnecting the primary terminal and the secondary terminal of the insulating transformer after the period of initial charging so that the conversion circuit operates as the insulating converter circuit.

* * * * *